United States Patent [19]
Kisanuki

[11] 3,909,137
[45] Sept. 30, 1975

[54] DIGITAL INDICATION EXPOSUREMETER
[75] Inventor: Toru Kisanuki, Toyokawa, Japan
[73] Assignee: Minolta Camera Kabushiki Kaisha, Japan
[22] Filed: June 18, 1974
[21] Appl. No.: 480,395

[30] Foreign Application Priority Data
June 18, 1973 Japan.............................. 48-69025

[52] U.S. Cl. .............. 356/223; 356/226; 354/23 D; 354/24
[51] Int. Cl.² ......................................... G01J 1/42
[58] Field of Search ........... 356/226, 202, 223, 215; 324/99 D; 354/23 D, 24

[56] References Cited
UNITED STATES PATENTS
| 2,761,968 | 9/1956 | Kuder | 324/99 D |
| 3,649,128 | 3/1972 | Rothschild et al. | 356/226 |
| 3,709,615 | 1/1973 | Blakeslee | 356/215 |
| 3,829,865 | 8/1974 | Kamasako | 356/223 |

Primary Examiner—Ronald L. Wibert
Assistant Examiner—Conrad J. Clark
Attorney, Agent, or Firm—Craig & Antonelli

[57] ABSTRACT

A digital indication exposure meter includes a photoelectric transducer circuit which produces an output current proportional to the intensity of lights incident to a photoelectric element, said transducer circuit including a circuit wherein an integrating capacitor is charged up by a photoelectric current of the photoelectric element in a manner that the voltage across both ends of the capacitor is proportional to the logarithm of the quantity of light received during a time of light measuring, a timer circuit which produces electric signals corresponding to the time of light measuring, an analog-digital converter which converts the analog output signal of the voltage in the integrating capacitor into a digital form and retains the information in a digital form, a coding circuit which is set to produce digital signals corresponding to film sensitivity, an adder circuit which computes the digital output of the analog-digital converter together with the digital information from the coding circuit, a decoder for converting the digital output from the adder into another digital output suitable for numeral displaying, and numeral displaying devices for indicating the output of the decoder.

2 Claims, 10 Drawing Figures

FIG. 3

| Count \ Output Terminal | 6b | 6c | 6d | Decimal Part of Exposure Index Number |
|---|---|---|---|---|
| 0 | L | L | L | |
| 1 | H | L | L | 1/3 |
| 2 | L | H | L | 2/3 |
| 0 | L | L | H | 1 |
| 1 | H | L | L | 1/3 |
| 2 | L | H | L | 2/3 |
| 0 | L | L | H | 1 |
| 1 | H | L | L | 1/3 |
| 2 | L | H | L | 2/3 |

FIG. 4

| Count \ Output Terminal | 6'b | 6'c | 6'd | 6'e | Exposure Index Number |
|---|---|---|---|---|---|
| 0 | L | L | L | L | Below Measurable Range |
| 1 | H | L | L | L | -2 |
| 2 | L | H | L | L | -1 |
| 3 | H | H | L | L | 0 |
| 4 | L | L | H | L | 1 |
| 5 | H | L | H | L | 2 |
| 6 | L | H | H | L | 3 |
| 7 | H | H | H | L | 4 |
| 8 | L | L | L | H | 5 |
| 9 | H | L | L | H | 6 |
| 10 | L | H | L | H | 7 |
| | | | | | Above Measurable Range |

FIG. 5

| Sv \ Output Terminal | 20a | 20b |
|---|---|---|
| 0 | L | L |
| 1/3 | H | L |
| 2/3 | L | H |

FIG. 6

| Sv \ Output Terminal | 21a | 21b | 21c | 21d | Film Sensitivity (ASA) |
|---|---|---|---|---|---|
| 2 | L | L | L | L | 12 |
| 3 | H | L | L | L | 25 |
| 4 | L | H | L | L | 50 |
| 5 | H | H | L | L | 100 |
| 6 | L | L | H | L | 200 |
| 7 | H | L | H | L | 400 |
| 8 | L | H | H | L | 800 |
| 9 | H | H | H | L | 1600 |
| 10 | L | L | L | H | 3200 |
| 11 | H | L | L | H | 6400 |

FIG. 7

| Av (=Bv−Tv+Sv) \ Output Terminal | 18c | 18d | 18e |
|---|---|---|---|
| 0 | L | L | L |
| 1/3 | H | L | L |
| 2/3 | L | H | L |
| 3/3 | H | H | L |
| 4/3 | L | L | H |

FIG. 8

| Av (=Bv−Tv+Sv) \ Output Terminal | 19f | 19g | 19h | 19i |
|---|---|---|---|---|
| −1 | L | L | L | L |
| 0 | H | L | L | L |
| 1 | L | H | L | L |
| 2 | H | H | L | L |
| 3 | L | L | H | L |
| 4 | H | L | H | L |
| 5 | L | H | H | L |
| 6 | H | H | H | L |
| 7 | L | L | L | H |
| 8 | H | L | L | H |
| 9 | L | H | L | H |
| 10 | H | H | L | H |
| 11 | L | L | H | H |
| 12 | H | L | H | H |
| 13 | L | H | H | H |
| 14 | H | H | H | H |

FIG. 9

| Av \ Output Terminal | Decoder Output 22a | 22b | Display by lamps |
|---|---|---|---|
| 0 | L | L | Nil |
| 1/3 | H | L | One lamp |
| 2/3 | H | H | Two lamps |
| 3/3 | L | L | Nil |
| 4/3 | H | L | One lamp |

FIG. 10

| Av \ Output Terminal | 23 a | b | c | d | e | f | g | h | 23 a' | b' | c' | d' | e' | f' | g' | Display by Seven-Segment devices |
|---|---|---|---|---|---|---|---|---|---|---|---|---|---|---|---|---|
| -1 | L | L | L | L | L | L | L | L | L | L | L | L | L | L | L | Nil |
| 0 | L | H | H | L | L | L | L | H | H | H | H | H | H | H | L | 1.0 |
| 1 | L | H | H | L | L | L | L | H | L | H | H | L | L | H | H | 1.4 |
| 2 | H | H | L | H | H | L | H | H | H | H | H | H | H | H | L | 2.0 |
| 3 | H | H | L | H | H | L | H | H | H | H | H | H | H | H | H | 2.8 |
| 4 | L | H | H | L | L | H | H | H | H | H | H | H | H | H | L | 4.0 |
| 5 | H | L | H | H | L | H | H | H | H | L | H | H | H | H | H | 5.6 |
| 6 | H | H | H | H | H | H | H | H | H | H | H | H | H | H | L | 8.0 |
| 7 | L | H | H | L | L | L | L | L | H | H | L | L | L | L | L | 11 |
| 8 | L | H | H | L | L | L | L | L | H | L | H | H | H | H | H | 16 |
| 9 | H | H | L | H | L | H | L | H | H | L | H | H | L | H | H | 22 |
| 10 | H | H | H | L | L | H | L | H | H | L | H | H | L | H | H | 32 |
| 11 | L | H | H | L | L | H | H | H | H | L | H | H | L | H | H | 45 |
| 12 | H | L | H | H | H | H | H | L | L | H | H | L | L | H | H | 64 |
| 13 | H | H | H | H | L | H | H | L | H | H | H | H | H | H | L | 90 |
| 14 | L | L | L | L | L | L | L | L | L | L | L | L | L | L | L | Nil |

DIGITAL INDICATION EXPOSUREMETER

BACKGROUND OF THE INVENTION

This invention relates to an exposure meter for use in photography and so on.

This invention more particularly concerns an exposure meter wherein information on brightness together with information on film sensitivity and aperture stop or shutter speed (exposure time) are computed so as to give the necessary shutter speed or stop.

In the conventional exposure meter, luminosity of the photographic object is converted into the electric current, the electric current is integrated by a capacitor, and the voltage across the capacitor terminals is indicated by an ammeter.

In the abovementioned conventional constitution, the capacitor functions to integrate the photoelectric current and to retain the integrated value thereafter in order to keep the measured brightness indicated by the ammeter.

By nature, the voltage across the capacitor gradually decreases, after ceasing of a charge, on account of a discharge within the capacitor itself as well as a discharge in the outer circuit connected to the capacitor. Accordingly, the gradual decrease of the voltage across the capacitor, hence, indication of the meter has been an inevitable shortcoming in the conventional exposure meter. In order to eliminate such a shortcoming, a device wherein a pointer of the ammeter is cramped by a mechanical cramping means has been devised. However, such a device necessarily requires a complicated and delicate mechanism. Accordingly, the reliability of the system has not been sufficient.

SUMMARY OF THE INVENTION

The present invention firstly purports to provide an exposure meter wherein the information on brightness is memorized in digital form by integrating the measured photographic current and subsequently converting the integrated analog value into a digital value, so that said shortcoming of gradual decrease of the indication is eliminated.

The present invention secondly purports to provide an exposure meter wherein the abovementioned converted digital value is indicated in a digital way, so that necessary information on film sensitivity and shutter speed or stop are easily processed in a digital way and that easy inputting, for instance, by key pushing, of the necessary information is possible, and also, sequential indications of various exposures for the same brightness but the different parameters (various sensitivities, shutter speeds or stops) are possible.

BRIEF DESCRIPTION OF THE DRAWING

FIGS. 3 and 4 are truth tables of the counter circuits 6 and 6';

FIGS. 5 and 6 are truth tables of the coding of the film sensitivity;

FIGS. 7 and 8 are truth tables of the outputs of the adders 18 and 19; and

FIGS. 9 and 10 are truth tables between the stop value Av and outputs of the decoding circuits 22 and 23.

DETAILED DESCRIPTION OF THE INVENTION

Figure 1:
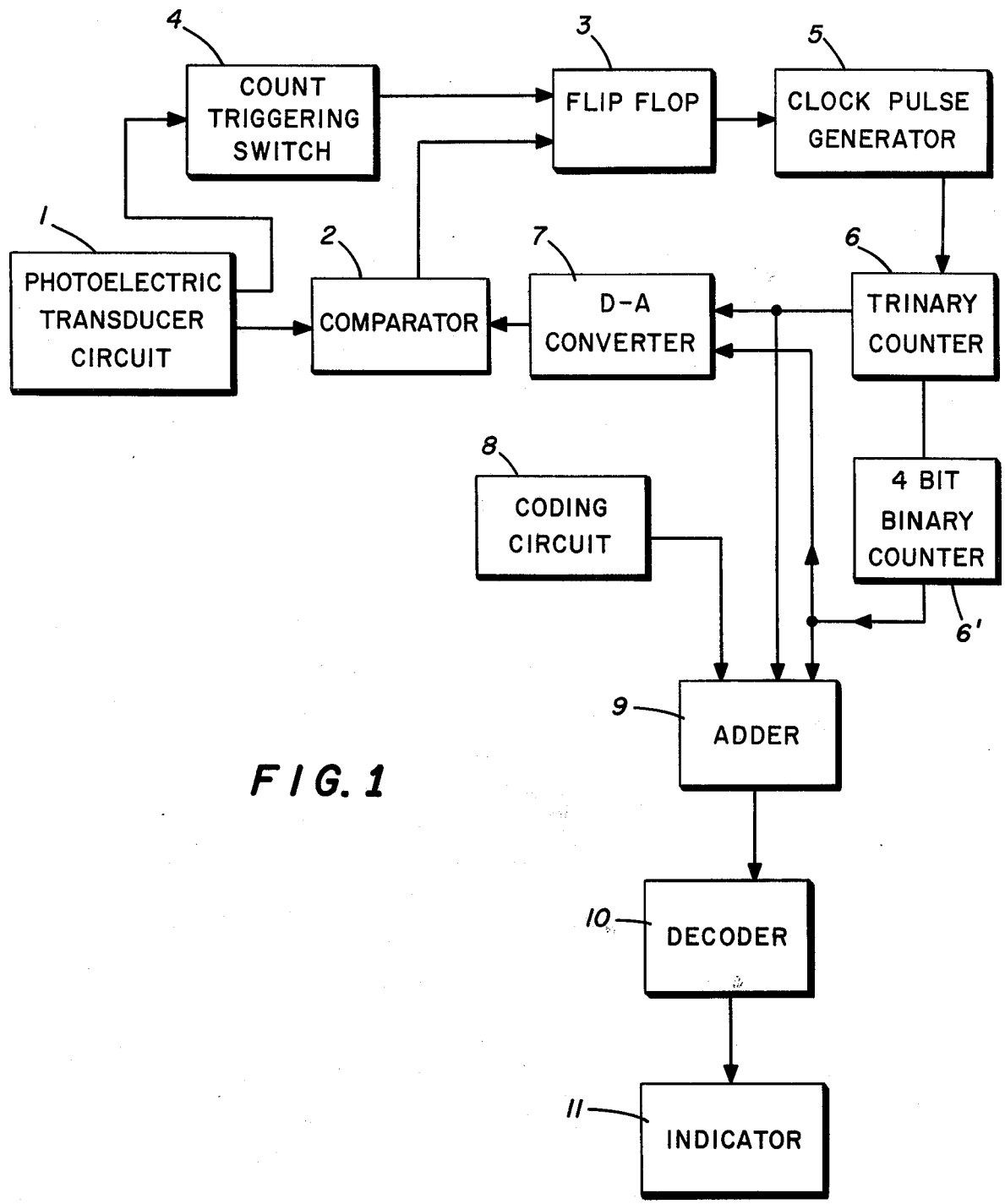
FIG. 1 is a block diagram of an embodiment of the present invention.

First, the constitution of the present invention is elucidated referring to FIG. 1 which shows the general constitution of the present invention. An electric output signal corresponding to the brightness of the photographic object is produced in the photoelectric transducer circuit 1, and the output signal is given to a comparator 2 as a first input signal. Then, a count triggering switch 4 gives triggering pulses to a flip-flop means 3 for controlling the clock pulse generator 5. Upon receipt of a triggering pulse, the flip-flop means 3 turns to the inverted state and triggers a clock pulse generator 5 to generate the clock pulses. The clock pulses are given to a trinary counter 6 and further to 4 bit binary counter 6', which give output signals to a digital-analog converter 7 (hereinafter referred to as a D-A converter). The D-A converter 7 sends its analog signal which is corresponding to its count to the second input terminal of the comparator 2. Thus, the comparator 2 compares the brightness signal from the transducer circuit 1 with the signal from the D-A converter 7, and sends out an output signal to the flip-flop means 3, so that the flip-flop means 3 is inverted and ceases oscillation of the clock pulse generator 5 thereafter. Then, the pulses from the generator 5 to the counters 6 and 6' stop and the count at that moment is memorized in the counter 6. The memorized count is also given to an adder 9 as a first input signal thereto. An output signal of a coding circuit 8, for inputting information on film sensitivity and shutter speed or stop, is given to the adder 9 as a second input signal thereto. The adder 9 is constituted to compute the photographic information in the below-mentioned well-known equation for an APEX system:

$$Ev = Sv + Bv = Tv + Av \qquad (1)$$

wherein,
$Ev$ = Exposure index in APEX system;
$Sv$ = film sensitivity index in APEX system;
$Bv$ = brightness index of the photographic object in APEX system;
$Tv$ = shutter speed index in APEX system; and
$Av$ = aperture stop index in APEX system.

Thus, the adder 9 gives a necessary value, for instance, aperture stop or shutter speed to the indicator 11 through the decoder 10. The decoder 10 converts the digital output in APEX system into other signals, for instance, signals suitable for well-known seven-segment display devices.

The photographic film on the market is generally so designed that the film sensitivities are of one value from the values with ⅓ Ev interval steps. Accordingly, in general, the film sensitivity setting means in the coding circuit 8 is so constituted as to indicate the necessary shutter speed or aperture stop with ⅓Ev interval steps.

On the other hand, in general photographic cameras, the aperture stop is designed so as to be set with ½ Ev intervals, and moreover, the intervals graduated on stop setting ring of ordinary cameras are of 1 Ev interval, namely, in a sequence of stops of 1.4, 2, 2.8, 5.6, 8, 11, 16, 22 . . . Accordingly, there is practically no use to constitute an indicator with indication intervals narrower than these orders. Thus, in the present apparatus, the indication intervals are designed to be ⅓ Ev.

In order to realize the ⅓ Ev interval step in indication, the embodiment of the present invention is so constituted that the indication of 1 Ev interval, namely, the integral parts of the measured value are indicated by a pair of known seven-segment display devices and the decimal part of the measured value is indicated by a pair of light-emitting diodes. According to such constitution, the circuit for the indicator as well as the decoder becomes far simpler than providing the indicator with another seven-segment display device for the decimal part, and consequently, power consumption in the converter and the indicator become smaller.

Hereinafter, an actual embodiment of the present invention is elucidated in detail referring to FIG. 2.

Figure 2:
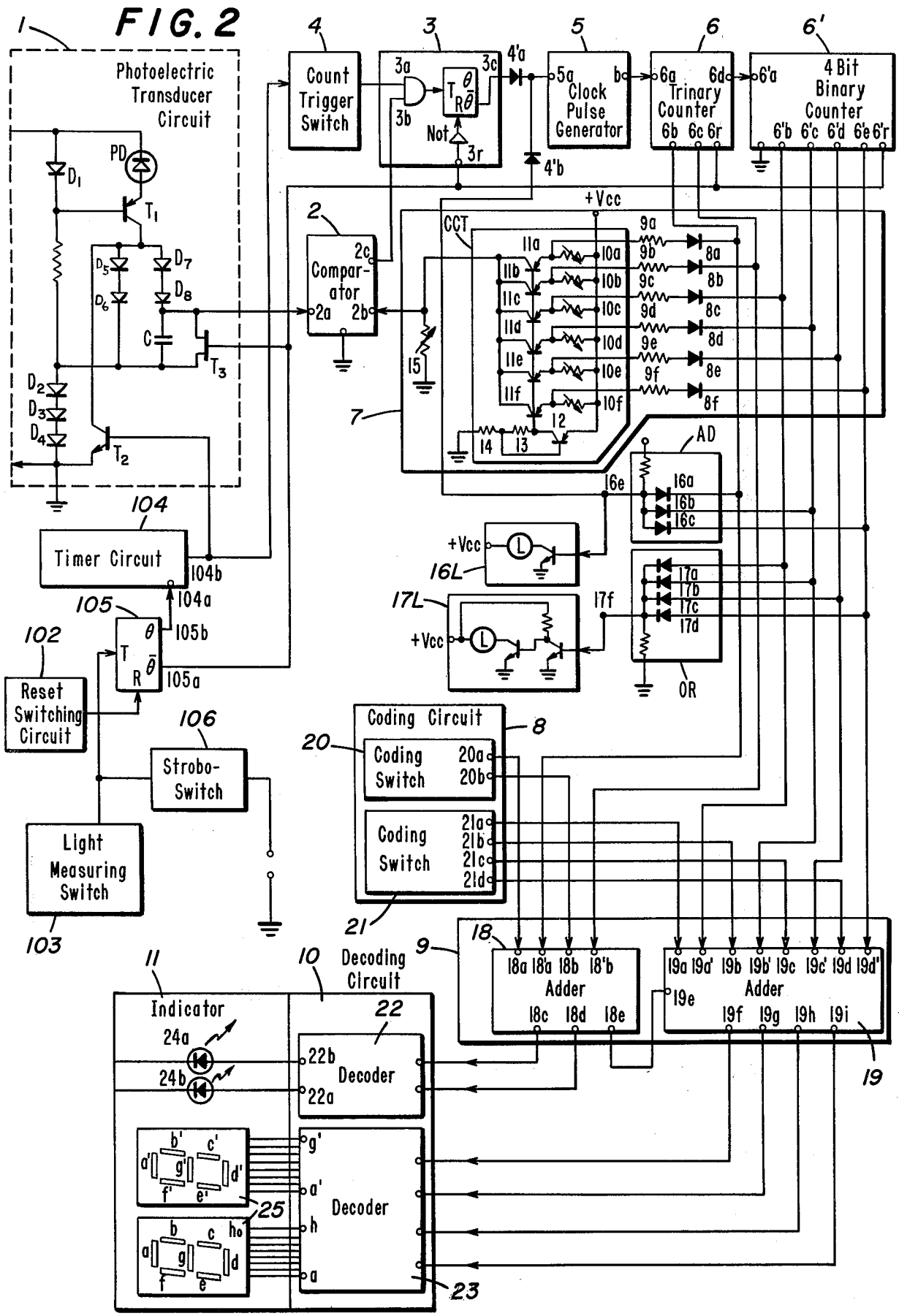
FIG. 2 is a further detailed diagram of the embodiment.

In FIG. 2, the photoelectric transducer circuit 1 is constituted by employing the invention disclosed in applicant's prior U.S. Pat. No. 3,575,443. In the circuit 1, the photodiode PD connected to the emitter of the transistor T1 generates a photoelectric current proportional to the intensity of the light incident thereto. The biasing diode D1 is for making the voltage across both ends of the photodiode PD very small by making the voltage between the base and the emitter of the transistor equal with that across both ends of the photodiode PD. The biasing diode D1 serves to decrease the dark current of the photodiode PD by the abovementioned setting. The level-shifting diodes D1, D2, D3 and D4 serve to shift the potential of the junction point between the resistor R1 and the diode D2 by a specified voltage from the ground potential. The resistor R1 is for restricting the current flowing in the diodes D1 to D4.

The diodes D5 to D8 and a capacitor C constitute an integral circuit. This part is a principal part of the circuit of phoeoelectric conversion. The capacitor C is provided with a voltage Vp which is proportional to the logarithm of the incident light quantity. Namely, $$Vp = A \log \int_0^t i_p dt \quad (2)$$

where:
- $A$ ... constant
- $t$ ... measuring period
- $i_p$ ... photoelectric current, which is proportional to the incident light intensity.

The received light quantity is proportional to the integral of the brightness of the measuring time (light receiving time). On the other hand, in the APEX indication system, the brightness is proportional to the value $2^{Bv}$, and the exposure time (light receiving time) is proportional to $2^{-Tv}$, and therefore, the logarithm of the received light quantity is proportional to (Bv-Tv). Accordingly, the abovementioned Vp is equivalent to the value (Bv-Tv).

The transistor T2 is for bypassing the photoelectric current. In the ordinary state this is made "ON", and the collector potential of the transistor T2 is almost at the ground level, and hence, almost no current flows through the diodes D5 and D7. During the exposure measurement the transistor T2 is made OFF for the duration identical with the exposure time, and allows the photoelectric current to flow through the diode D5 and D7. A field effect transistor (hereinafter: FET) T3 works for discharging the charge in the capacitor C. The FET T3 is ON until the measuring state, and is turned OFF for measurement. By turning the transistor T3 OFF and subsequently turning the transistor T2 OFF for a specified period, then, during the period, the photoelectric current is given to the diodes D5 and D7. Thus, the abovementioned voltage Vp is given to the input terminal 2a of the comparator 2.

A light measuring switch circuit 102 is a reset-switching circuit including a manually operated switch, which causes the circuit 102 to give a signal to a reseting flip-flop 105. Upon receipt of the signal, the flip-flop 105 is inverted (reset) to give the "High" level output through its output terminal 105a to the reset terminals of circuits 3, 6, and 6'. Therefore, the circuits 3, 6, and 6' become reset.

A light measuring switch circuit 103 is for starting the measurement of the flash exposure, and the circuit 103 includes a manually operated switch, or a photoelectric switch capable of making a switching action upon receiving a photoflash light. When such switch is switched, an output signal is given to the flip-flop 105, and the flip-flop 105 is reset to turn its output at the terminal 105a to the "Low" level, and its output at the terminal 105b to the High level, so as to trigger a timer circuit 104 to start. The timer circuit 104 consists mainly of a mono-multi-vibrator, and outputs a Low output from output terminal 104b for a preset period from being triggered. This period is the period for light measuring, i.e., the period during which the flash light is measured.

The above-mentioned period of Low level output is determined by time constants of a capacitor(s) and resistor(s) of the timer circuit 104. By utilizing a variable resistor as the resistor, any desired period is obtainable. In the preferred embodiment, exposure periods identical with those in the cameras are used as the above-mentioned period.

During the period circuit 104 is of Low level, the transistor T2 is OFF, and exposure measurement is made in this period. The count triggering switch 4 responds to a rise up of an output signal of the circuit 104 from Low to High, and sends out a pulse to the input terminal 3a of the flip-flop means 3. Since the D-A converter 7 does not yet send its ouput signal to the comparator 2, the comparator 2 does not yet send an output from its output terminal 2c to the input terminal 3b of the flip-flop means 3. Therefore, upon receipt of the count-starting signal from the count triggering switch 4 to the input terminal 30, the flip-flop means 3 is switched, so that its output at terminal 3c is turned from the High level to the Low level. As a result of the above-mentioned switching of the flip-flop means 3, the inhibition signal hitherto being given from the flip-flop means 3 through the diode 4'a to the clock pulse generator 5 is cut off. Thus, the clock pulse generator 5 is counted by the trinary counter circuit 6. The digital output of the circuit 6 is continuously converted into an analog signal by the D-A converter 7. Then, as the time lapses, the count of the circuit 6 increases and the analog output of the D-A converter 7 increases, and at a certain time, the output of the comparator 2 is reversed. By the above reversing of the output of the comparator 2, the output of the flip-flop 3 is switched to the Low level, and the conversion is over. From this time on, both the digital and analog information is retained in the system.

Incidentally, a strobo-triggering switch 106 is provided so as to receive the output of a manually operated light measuring switch 103, and the output signal of the strobo-triggering switch 106 is used for triggering a stroboflash apparatus, the light of which is to be measured. The output of the light is measured.

In the present invention, in order to provide the resolving power of ⅓ Ev interval steps of the exposure, the trinary counter 6 is employed. The clock pulses are given to the input terminal 6a as input pulses to the first pulse counter circuit 6, and output signals shown in the table of FIG. 3 are produced at output terminals 6b, 6c and 6d. Namely, at every three count-outputs from the trinary counter 6, a High level output signal is sent out from the output terminal 6d of the circuit 6. One interval of this High level signal corresponds to 1 Ev value, and the signal is given to the input terminal 6'a of the second counter 6' of 4 bits binary type. Thus, the second counter 6' counts exposure value for every 1 Ev interval. The second counter 6' is constituted by known parts so as to send out pulses shown in the truth table of FIG. 4, from its output terminals 6'b, 6'c, 6'd and 6'e. The above-mentioned output terminals 6b and 6c, as well as, 6'b to 6'e are connected to the D-A converter 7 comprising a known constant-current circuit CCT. The circuit CCT comprises variable resistors 10a, 10b, ... 10f, transistors 11a, 11b, ... 11f, 12, and resistors 13 & 14. Also, series connections of resistors 9a ... 9f and diodes 8a ... 8f are connected between the above-mentioned output terminals 6b, 6c, 6'b, 6'c, 6'd, 6'e and emitters of the transistors 11a ... 11f, respectively. Accordingly, when output signals sent from the output terminals 6b, 6c, 6'c, 6'd, 6'e are of High levels, the High level signals can not pass the diodes 8a ... and 8f, and the corresponding transistors 11a ... and 11f become ON, respectively. And therefore, constant currents preset by the variable resistors 10a ... and 10f are given at the collectors of the transistors 11a ... and 11f. The collectors of the transistors 11a to 11f are connected to a feedback resistor 15, so that a feedback voltage corresponding to a sum of the constant currents at the collectors is obtainable across the resistor 15. When output signals sent out from the terminals 6b, 6c, 6'b, 6'c, 6'd, or 6'e are of Low level, then the diodes 8a ... or 8f become biased in the forward direction, and a circuit is completed, connecting the power source terminal +Vcc → variable resistors 10a ... or 10f → resistors 9a ... or 9f → diodes 8a ... or 8f → output terminals 6b, 6c, 6'b, 6'c, 6'd or 6'e → and the opposite end of the power source, i.e., the ground. And as a result, the emitter voltages of the transistors 11a ... or 11f are lowered, and their collector currents cease to flow. Therefore, the comparator 2 receives a feedback signal which is a voltage proportional to the sum of the constant currents allowed to flow by the High level signal from any of the output terminals 6b, 6c, 6'b, 6'c, 6'd and 6'e.

In the above-mentioned constitution, by adjusting the values of the variable resistors 10a ... 10f in a manner that the output currents as converted to analog values are proportional to the above-mentioned input digital values, and by adjusting the variable resistor 15 in a manner that the APEX brightness value and the gradient of necessary feedback voltage are proportional to each other, then an analog feedback current proportional to the digital count output flows through the resistor 15. Thus, a voltage proportional to the count is given to the input terminal 2b of the comparator 2.

As the count proceeds in the above-mentioned way, in the comparator 2, the aforementioned first input signal (Bv-Tv) at the input terminal 2a and the second input signal at the input terminal 2b are compared in succession. And then, when both the above-mentioned voltages become balanced, an output pulse is sent out from the output terminal 2c of the comparator 2 to the reset toggle signal input terminal 3b of the flip-flop means. Accordingly, the output signal of the flip-flop means 3 turns from Low level to High level, and the High level signal is given through the diode 4'a to the control signal input terminal 5a of the clock pulse generator 5. As a result, the clock pulse generator 5 is turned to the "OFF" state and the clock pulses are stopped. Thus, the count of counter 6 and the output of D-A converter 7 is fixed in state where both of the aforementioned inputs to the comparator 2 become balanced, namely at the count which is corresponding to the measured brightness and to the measuring time.

An AND circuit AD consisting of diodes 16a, 16b and 16c connected to the output terminals 6b, 6'c and 6'e, respectively, and of a resistor 16d connected to the power source terminal +Vcc is for producing a warning signal against an excess exposure. When all the signals to its diodes 16a to 16c are of High level, a High level output signal is given through its output signal 16e and a diode 4'b to the input terminal 5a of the aforementioned clock pulse generator 5, so as to stop oscillation of the clock pulses to fix the count. An OR circuit OR consisting of diodes 17a ... 17d connected to the output terminals 6'b ... 6'e, respectively, and of a resistor 17e is for producing a warning signal against a lack of exposure. When all the signals to its diodes 17a ... 17d are of Low level, a Low level output is sent out to its output 17f.

By utilizing the above-mentioned warning signals for excessive exposure and for lack of exposure, known warning lamps (not shown in the drawing) can be lit.

When the input value (Bv-Tv) is within a measurable range, as is described above, fixed count outputs are obtainable at the output terminals 6b, 6c, 6'b, 6'c, 6'd and 6'e, and further, these count outputs are also given to input terminals 18a, 18a', 18b and 18b' of a 2-bits binary full adder 18 and to input terminals 19a, 19b, 19c and 19d of a 4-bits binary full adder 19, respectively.

In this example, information corresponding to the film sensitivity Sv is set by the coding switches 20 and 21 of the switching circuit 8. This information is made by code-converting the Sv value by the coding switches 20 and 21 in accordance with the truth table of FIGS. 5 and 6. The adding counter 18 sums up input values at its input terminals 18a or 18b and 18a' or 18b', respectively, and the adder 19 sums up input values at its input terminals 19a to 19 h and 19a' to 19d', respectively. Thus, outputs as shown in the truth table of FIGS. 7 and 8 are obtainable at the output terminals 18c, 18d, 18e, 19f, 19g, 19h and 19i. The output at the output terminal 18e is given to the input terminal 18e as a carry signal, and the adder 19 sums up to include this signal.

With the above-mentioned constitution, the outputs at the output terminals 18c, 18d, 19f, 19g, 19h and 19i become a signal corresponding to the sum of the (Bv-Tv) value and the Sv value, namely the aperture stop value Av=Bv−Tv+Sv.

The above-mentioned Av value is indicated by two seven-segment display devices 25 and 25 for a two figure stop value of 1 Ev interval values (integral part), and by two small lamps such as light emitting diodes 24a and 24b for stop values of ⅓ Ev. For such indications, decoders 22 and 23 are inserted before the display devices 25 and the small lamps, respectively, in a manner that digital indications according to the truth table of FIGS. 9 and 10 are made, so that digital indications of the aperture stop values in the ordinary (1, 1.4, 2, 2.8, 5.6, 11 . . . ) system corresponding to a suitable Av value in the APEX system is obtainable.

The apparatus of the present invention has the following advantages:

1. Since the integrated value of the photoelectric current is memorized in digital form, there is no decrease of the memorized value.

2. Since coding switches 20 and 21 for setting the decimal part of film sensitivity and for setting the integral part of film sensitivity, respectively, are provided in relation to the A-D converter circuit, the setting of the film sensitivity can be made, for instance, by simply selecting and pushing a key or keys of a sensitivity setting keyboard.

Also, since the measured brightness is digitally memorized, successive utilizations of the measured value in computing different stops or shutter speeds for different conditions (e.g., different shutter speeds, stops or film sensitivities) can be easily and precisely made.

In the present apparatus, the exposure value is indicated with 1 Ev intervals by seven-segment display device and with ⅓ Ev intervals by a pair of lamps. Since the exposure values are indicated with ⅓ Ev intervals, the present apparatus is sufficient and practical for utilizing ordinary photographic films available in the market with the ⅓ Ev intervals. Also it is easier to read the measured value with ⅓ Ev intervals in the digital way than to read decimal value for ⅓ Ev intervals indicated by conventional analog way.

Furthermore, in the present invention, output of the photoelectric transducer circuit 1, namely the voltage charged in the capacitor C is in analog value, which is in linear relation with the logarithm of the total quantity of light received within a defined time, which logarithm corresponds to the value (Bv-Tv). Therefore, the measured light quantity signal is converted in the digital value, which can be directly processed with adders so as to digitally indicate Av or F value. Therefore, the circuit constitution is rather simple for highly advanced functions.

I claim:

1. A digital indication exposure meter comprising:

a photoelectric transducer circuit which produces an output current proportional to the intensity of lights incident to a photoelectric element, said transducer circuit including a circuit wherein an integrating capacitor is charged up by a photoelectric current of the photoelectric element in a manner that the voltage across both ends of the capacitor is proportional to the logarithm of quantity of light received during a time of light measuring, a timer circuit which produces electric signals corresponding to the time of light measuring, an analog-digital converter which converts the analog output signal of the voltage in the integrating capacitor into a digital form and retain the information in a digital form, a coding circuit which is set to produce digital signals corresponding to film sensitivity, adder circuit which computes the digital output of the analog-digital converter together with the digital information from the coding circuit, a decoder for converting the digital output from the adder into another digital output suitable for numeral displaying, and numeral displaying devices for indicating the output of the decoder.

2. A digital indication exposure meter according to claim 1, characterized in that the indicator comprises at least two numeral display devices which display integral part of the computed stop value, and at least one lamp which displays decimal part of the computed stop value.

* * * * *